(12) United States Patent
Isaksson et al.

(10) Patent No.: US 12,196,552 B2
(45) Date of Patent: *Jan. 14, 2025

(54) SYSTEM AND METHOD FOR PROVIDING IMPROVED GEOCODED REFERENCE DATA TO A 3D MAP REPRESENTATION

(71) Applicant: Maxar International Sweden AB, Linköping (SE)

(72) Inventors: Folke Isaksson, Linkoeping (SE); Ola Nygren, Linghem (SE)

(73) Assignee: MAXAR INTERNATIONAL SWEDEN AB, Linköping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,856

(22) Filed: May 11, 2022

(65) Prior Publication Data

US 2022/0276046 A1  Sep. 1, 2022

Related U.S. Application Data

(63) Continuation of application No. 17/164,013, filed on Feb. 1, 2021.

(30) Foreign Application Priority Data

Jan. 27, 2021 (EP) ..................... 21153822

(51) Int. Cl.
  *G01C 11/02* (2006.01)
  *G01C 11/06* (2006.01)
  *G06T 17/05* (2011.01)
(52) U.S. Cl.
  CPC ............ *G01C 11/025* (2013.01); *G01C 11/06* (2013.01); *G06T 17/05* (2013.01); *G06T 2207/30184* (2013.01)

(58) Field of Classification Search
  CPC ....... G01C 11/025; G01C 11/06; G06T 17/05; G06T 2207/30184; G06T 2207/10032; G06T 7/579
  See application file for complete search history.

(56) References Cited

U.S. PATENT DOCUMENTS 6,985,620 B2    1/2006  Sawhney et al.
9,372,081 B2 *  6/2016  Isaksson ................. G06F 16/29
(Continued)

FOREIGN PATENT DOCUMENTS

AU    2015265416 B2      3/2017
EP       3232155 A1  * 10/2017
(Continued)

OTHER PUBLICATIONS

European Patent Office, Extended European Search Report received for Application No. 21153822.8, dated Jul. 26, 2021, 10 pages, Germany.

(Continued)

*Primary Examiner* — Richard A Hansell, Jr.
(74) *Attorney, Agent, or Firm* — Harness, Dickey & Pierce, P.L.C.

(57) ABSTRACT

Described are a system (200) and method arranged to provide improved geocoded reference data to a 3D map representation. The system comprises a storage (201) having stored thereupon a 3D map representation comprising a textured 3D representation provided with geocoded reference data and formed based on imagery, the imagery being associated to information relating to at least one imaging device which has captured the imaging. The system comprises further a processor (208) arranged to receive at least one new image associated to information related to an imaging device which has captured the new image, perform registration of the new image to the 3D map representation, determine corresponding points in the new image and the 3D (Continued)

map representation, and determine displacement data for a plurality of 3D positions in the 3D map representation based on the determined corresponding points in the new image and the 3D map representation.

20 Claims, 4 Drawing Sheets

(56) References Cited

U.S. PATENT DOCUMENTS

| | | | | |
|---|---|---|---|---|
| 2005/0220363 A1* | 10/2005 | Oldroyd | ................ | G01C 11/00 |
| | | | | 382/294 |
| 2006/0215935 A1* | 9/2006 | Oldroyd | ................ | G06V 20/13 |
| | | | | 382/294 |
| 2007/0002040 A1* | 1/2007 | Oldroyd | ................ | G01C 11/00 |
| | | | | 345/419 |
| 2007/0002138 A1* | 1/2007 | Oldroyd | ................ | G06T 17/05 |
| | | | | 348/143 |
| 2011/0148866 A1* | 6/2011 | Chu | ................ | G06T 17/05 |
| | | | | 345/419 |
| 2014/0340427 A1* | 11/2014 | Baker | ................ | G06T 5/50 |
| | | | | 345/641 |
| 2015/0078652 A1* | 3/2015 | Olofsson | ................ | G01C 11/06 |
| | | | | 382/154 |
| 2015/0145965 A1* | 5/2015 | Livyatan | ................ | G06F 18/22 |
| | | | | 348/47 |
| 2015/0243047 A1* | 8/2015 | Haglund | ................ | G06V 20/13 |
| | | | | 382/201 |
| 2015/0363972 A1* | 12/2015 | Isaksson | ................ | G06T 7/44 |
| | | | | 345/423 |
| 2016/0210525 A1* | 7/2016 | Yang | ................ | G06V 10/32 |
| 2017/0200309 A1* | 7/2017 | Qian | ................ | G06T 15/04 |
| 2021/0349922 A1* | 11/2021 | Hsu | ................ | G06F 16/29 |
| 2022/0392156 A1* | 12/2022 | Yngesj | ................ | G06T 7/579 |

FOREIGN PATENT DOCUMENTS

| | | |
|---|---|---|
| WO | WO 2014/112908 A1 | 7/2014 |
| WO | WO 2014/112909 A1 | 7/2014 |

OTHER PUBLICATIONS

U.S. Appl. No. 17/164,013, filed Feb. 1, 2021, Pending.

United States Patent and Trademark Office, Non-Final Office Action received for U.S. Appl. No. 17/164,013, dated Jul. 18, 2022, 18 pages, US.

* cited by examiner

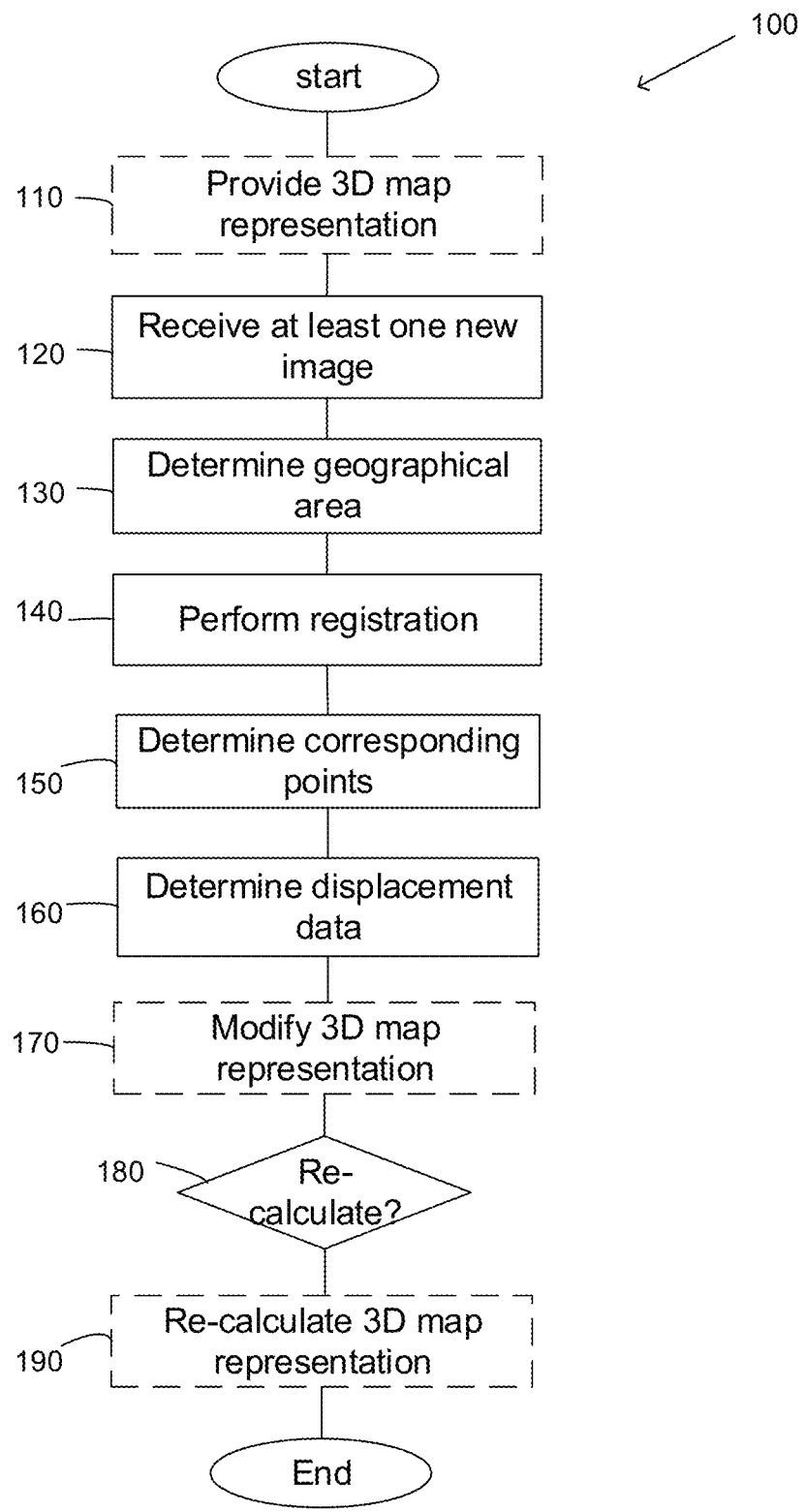

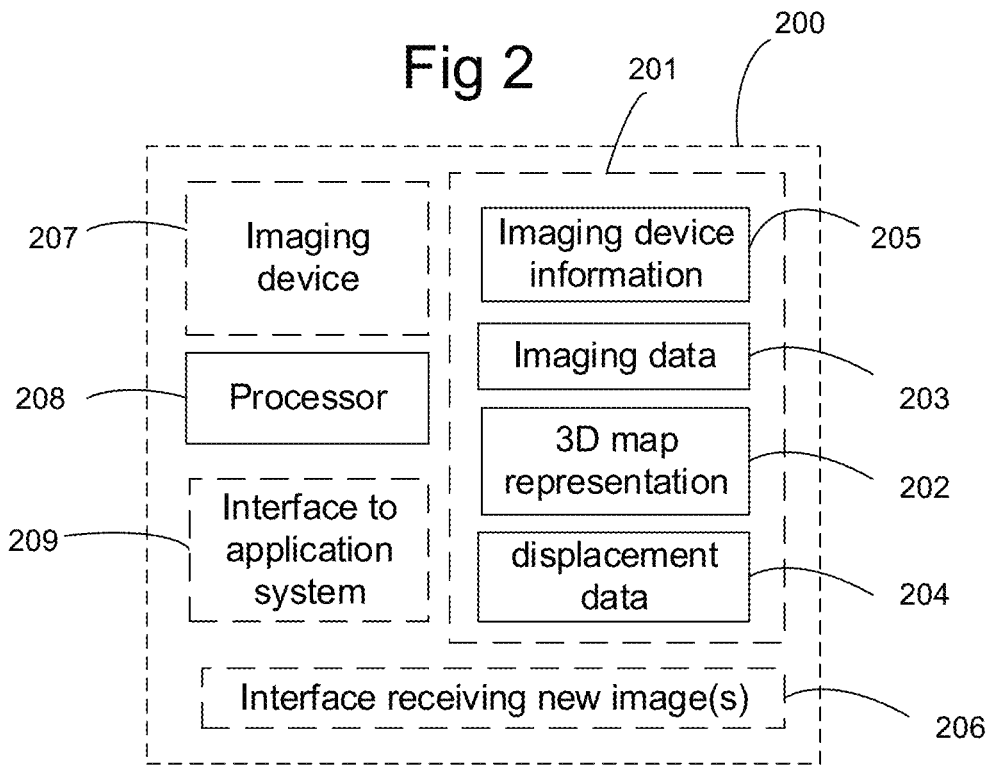
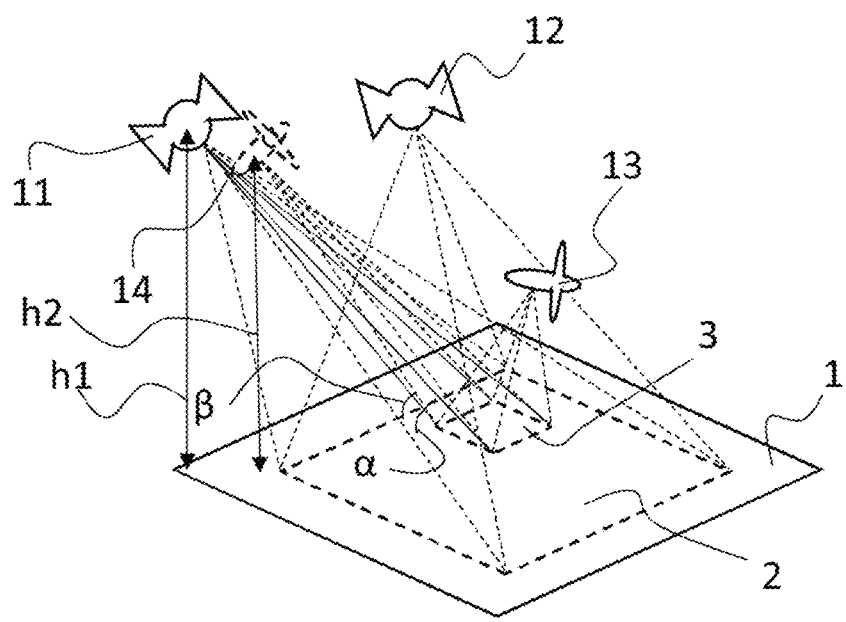

SYSTEM AND METHOD FOR PROVIDING IMPROVED GEOCODED REFERENCE DATA TO A 3D MAP REPRESENTATION

CROSS REFERENCE TO RELATED APPLICATIONS

This application is a continuation of and claims priority to and the benefit of U.S. patent application Ser. No. 17/164,013, filed Feb. 1, 2021, which application further claims priority to and the benefit of European Patent Application No. 21153822.8, filed on Jan. 27, 2021; the contents of both of which as are hereby incorporated by reference in their entireties.

BACKGROUND

Related Field

The present invention relates to a system and method for providing improved geocoded reference data to a 3D map representation.

Related Art

A fast growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects.

3D map representation may be formed for example based on processing of at least partly overlapping images. It is a challenge to provide 3D geocoded reference data to such 3D map representations, which 3D geocoded reference data corresponds to the real world.

BRIEF SUMMARY

According to a first aspect of the present invention, a system is arranged to provide improved geocoded reference data to a 3D map representation. The system comprises a storage having stored thereupon said 3D map representation. The 3D map representation comprises for each of at least one geographical area, a textured 3D representation provided with geocoded reference data and formed based on imagery provided for that geographical area, said imagery being associated to information relating to at least one imaging device which has captured the imagery, said information comprising intrinsic and extrinsic parameters of said at least one imaging device. The system comprises a processor arranged to receive at least one new image associated to information related to an imaging device which has captured the new image, said information comprising intrinsic and extrinsic parameters of the imaging device, determine that the new image belongs to at least one of the at least one geographical areas, perform registration of the new image to the 3D map representation, determine corresponding points in the new image and the 3D map representation, and determine displacement data for a plurality of 3D positions in the 3D map representation based on the determined corresponding points in the new image and the 3D map representation.

Thus, displacement data is determined for a plurality of 3D positions in the 3D map representation from comparison between the determined corresponding points in the new image and the 3D map representation.

In an embodiment, the processor is arranged to modify the 3D map representation with the determined displacement data for the plurality of 3D positions.

Thus, improved geocoded reference data is provided to the 3D map representation without re-calculating the 3D map representation or parts thereof. This has the effect that limited processing capacity is required for taking into account new images in the 3D map representation. Thus, improved geocoded reference data of new images can quickly be implemented in the 3D map representation.

The determination of displacement data for a plurality of 3D positions in the 3D map representation for a plurality of 3D positions in the 3D map representation may comprise weighting the influence from the new image against the influence from the 3D map representation.

The weighting of the influence from the new image against the influence from the 3D map representation may be based on at least one of the following: the specification of the imaging device(s) used, and/or reliability of relevant intrinsic and/or extrinsic parameters of the respective imaging device(s) used for the 3D map representation and/or the new image.

The imagery and/or new image may be LIDAR and/or RADAR and/or images captured with a camera.

In different embodiments, the imaging comprises an image set comprising at least partly overlapping images belonging to the geographical area, each image of the image set being associated to the information relating to the imaging device which has captured the image, said information comprising intrinsic and extrinsic parameters of the imaging device. Determining corresponding points in the new image and the 3D map representation may then comprise performing bundle adjustments between the new image and each image of the image set at least partly overlapping with the new image.

In different embodiments, the 3D map representation further comprises 3D representation uncertainty data for a plurality of 3D positions in the 3D representation, said uncertainty data defining an uncertainty distance and direction, wherein the determination of displacement data for a plurality of 3D positions in the 3D map may comprise weighting the influence from the new image against the influence from the 3D map based on the uncertainty data.

The processor may be arranged to calculate updated 3D representation uncertainty data based on the displacement data, wherein the updated 3D representation uncertainty data may be stored as part of the 3D map representation.

In different embodiments, the system further comprises an interface to an application system, said interface being operatively connected to the storage having stored thereupon the 3D map representation.

The system may be arranged to provide the 3D position data for at least a part of the 3D map representation at request from the application system via the interface.

The processor may further be arranged to re-calculate the 3D map representation based on the imaging and the at least one new image. This characteristically is a more demanding with regard to processing than determining the displacement data. Therefore, re-calculating the 3D map representation may be made less frequently than the determination of the displacement data. Further, the determination of displacement data may be made when processing capacity is not available for re-calculating the 3D map representation. Re-calculation of the 3D map representation may then be made when processing capacity is available.

The processor may be arranged to identify whether to make a re-calculation of the 3D map representation based on the displacement data. Thus, the processor may be arranged to re-calculate selected parts of the 3D map representation, wherein the selection is made based on the displacement data.

The images of the image set and/or new image(s) may comprise satellite images captured from one or a plurality of satellites.

The 3D representation may comprise a textured, georeferenced mesh.

When the 3D map representation comprises a textured 3D representation for a plurality of geographical areas, the processor may be arranged to determine whether the new image belongs to at least two geographical areas and when it has been determined that the image belongs to at least two geographical areas and thus forms a bridge between said two geographical areas, the processor is arranged to determine displacement data for a plurality of 3D positions in the textured 3D representations belonging to the two geographical areas based on the determined corresponding points in the new image and the textured 3D representations belonging to the two geographical areas.

The present disclosure further relates to a method for providing improved georeferenced position data to a 3D map representation, said 3D map representation comprising for each of at least one geographical area, a textured 3D representation provided with geocoded reference data and formed based on imagery provided for that geographical area, said imagery being associated to information relating to an imaging device which has captured the imagery, said information comprising intrinsic and extrinsic parameters of the imaging device, said method comprising the steps of: receiving at least one new image associated to information related to an imaging device which has captured the new image, said information comprising intrinsic and extrinsic parameters of the imaging device, determining that the new image belongs to at least one of the at least one geographical areas, performing registration of the new image to the 3D map representation, determining corresponding points in the new image and the 3D map representation, and determining displacement data for a plurality of 3D positions in the 3D map representation based on the determined corresponding points in the new image and the 3D map representation.

The present disclosure further relates to a computer program for providing improved georeferenced position data to a 3D map representation, comprising instructions which, when executed by at least one processor cause the at least one processor to carry out the method above.

The present disclosure further relates to a computer-readable storage medium carrying a computer program for providing improved georeferenced position data to a 3D map representation according to the above.

BRIEF DESCRIPTION OF THE DRAWINGS

In the following description of various and preferred embodiments, reference will be made to the attached drawings on which:

FIG. 1 is a flow chart illustrating an example of a method for providing improved georeferenced position data to a 3D map representation;

FIG. 2 is a block scheme illustrating an example of a system for providing improved georeferenced position data to a 3D map representation;

FIG. 3 shows schematically the capture of images of an area on the ground using a satellite and an aircraft;

DETAILED DESCRIPTION OF VARIOUS EMBODIMENTS

Figure 4:
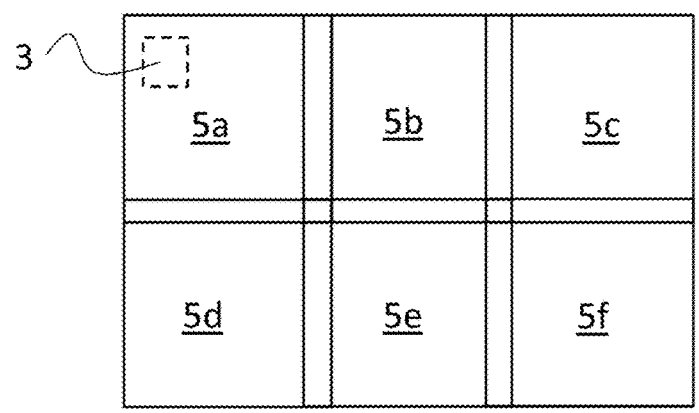
FIG. 4 shows schematically how a part of the globe may be covered by a plurality of areas on the ground, wherein each area may be covered by a plurality of images.

In the following description the same reference numerals will be used for similar features in the different drawings. The drawings are not drawn to scale.

In FIG. 1, an example of a method 100 for providing improved georeferenced position data to a 3D map representation is illustrated. The 3D map representation comprises for each of at least one geographical area, a textured 3D representation provided with geocoded reference data. The 3D map representation is formed based on imagery provided for that geographical area. The imagery is associated to information relating to an imaging device that has captured the imaging. The information relating to the imaging device comprises intrinsic and/or extrinsic parameters of the imaging device. The information comprises for example a geographical 3D position of the imaging device and/or a pointing direction and/or Field-of-View of the imaging device.

The method may start with a step of providing 110 the 3D map representation.

The method comprises receiving 120 at least one new image associated to information related to an imaging device which has captured the new image, said information comprising intrinsic and extrinsic parameters of the imaging device. The new image may have characteristics which are considered to improve the georeferenced position data of the 3D map representation if included in the 3D map representation. For example, the new image may have been captured using an imaging device, the pointing direction of which is known with a high accuracy, characteristically higher that the accuracy of the pointing direction connected to the imaging devices on which the 3D map representation was formed.

The method comprises determining 130 that the new image belongs to at least one of the at least one geographical areas. The 3D map representation may comprises a textured 3D representation for a plurality of geographical areas. It may then be determined 130 whether the new image belongs to at least one of the geographical areas. It may in addition thereto be determined whether the new image belongs to at least two geographical areas.

The method comprises performing 140 registration of the new image to the 3D map representation. This is known in the art and not described in detail herein. For example, this is described in WO 2014/112909. The method comprises thereafter a step of determining 150 corresponding points in the new image and the 3D map representation.

The imagery may comprise an image set comprising at least partly overlapping images belonging to the geographical area. As mentioned above, each image of the image set is associated to the information relating to that imaging device which has captured the image, said information comprising intrinsic and extrinsic parameters of the imaging device. The determining step 150 for determining corresponding points in the new image and the 3D map representation may then comprise performing bundle adjustments between the new image and each image of the image set at least partly overlapping with the new image.

The method comprises further a step of determining 160 displacement data for a plurality of 3D positions in the 3D map representation based on the determined corresponding points in the new image and the 3D map representation.

The displacement data provides improved geocoded reference data to the 3D map representation.

The step of determining 160 displacement data for a plurality of 3D positions in the 3D map representation may comprise weighting the influence from the new image against the influence from the 3D map representation. The weighting of the influence from the new image against the influence from the 3D map representation may be based on uncertainty data relating to the 3D map representation and/or relating to the new image.

The uncertainty data may characteristically define an uncertainty distance and direction.

The uncertainty data may depend on at least one of the following: the specification of the imaging device(s) used for the 3D map representation and/or the new image (including intrinsic and/or extrinsic parameters), reliability of relevant intrinsic and/or extrinsic parameters of the respective imaging device(s) used for the 3D map representation and/or the new image, and/or the number of images used in the 3D map representation for modelling the area covered by the new image.

In an example, when the imaging comprises an image set comprising at least partly overlapping images belonging to the geographical area, the step of determining 160 displacement data for a plurality of 3D positions in the 3D map representation may comprise weighting the influence from the new image against the influence from the 3D map based on the number of images used in the 3D map representation for modelling the area covered by the new image.

In an additional or alternative example, the three dimensional geocoded reference data of the 3D map representation may for a plurality of 3D positions in the 3D representation further comprise 3D representation uncertainty data. The uncertainty data may, as stated above, define an uncertainty distance and direction. The step of determining 160 displacement data for a plurality of 3D positions in the 3D map representation may then comprise weighting the influence from the new image against the influence from the 3D map representation based on the uncertainty data. Thus, if the three-dimensional geocoded reference data of the 3D map representation is uncertain, then the new image can have a bigger influence than if the uncertainty in the 3D map representation is low.

The method may comprise a step of modifying 170 the 3D map representation with the determined displacement data for the plurality of 3D positions. For example, when the 3D map representation comprises 3D representation uncertainty data for a plurality of 3D positions in the 3D representation, updated 3D representation uncertainty data may also be determined based on the displacement data, wherein the updated 3D representation uncertainty data may be stored as part of the 3D map representation.

When the 3D map representation comprises a textured 3D representation for a plurality of geographical areas, and it has been determined that the new image belongs to at least two geographical areas thus forms a bridge between said two geographical areas, displacement data may be determined 160 for a plurality of 3D positions in the textured 3D representations belonging to the two geographical areas based on the determined corresponding points in the new image and the textured 3D representations belonging to the two geographical areas. Then this new image is contributing to linking different geographical areas together and thus contributing to providing a globally continuous and accurate 3D map representation.

The method further comprises re-calculating 190 the 3D map representation based on the imagery and the at least one new image. The method may comprise identifying 180 whether to make the re-calculation 190 of the 3D map representation based on the displacement data. Further, when the 3D map representation comprises 3D representation uncertainty data and/or updated 3D map representation uncertainty data, the step of identifying 180 whether to make a re-calculation 190 of the 3D map representation may instead or in addition thereto be based on the uncertainty data. When the 3D map representation has been recalculated, the uncertainty data is characteristically also updated to relate to the recalculated 3D map representation.

In FIG. 2, an example of a system 200 arranged to provide improved geocoded reference data to a 3D map representation is illustrated. The system 200 comprises a storage 201 having stored thereupon said 3D map representation 202. The 3D map representation comprises for each of at least one geographical area, a textured 3D representation provided with geocoded reference data. The 3D map representation 202 is formed based on imaging provided for that geographical area. The 3D representation provided with geocoded reference data may comprise a textured, georeferenced mesh. Alternatively, the 3D map may be represented as a surface representation, or as a voxel representation.

In the illustrated example, the storage 201 has an imagery data storage part 203 in which at least a part of the imagery is stored. The imagery is associated to information relating to an imaging device that has captured the images, said information comprising intrinsic and extrinsic parameters of the imaging device. The information 205 relating to an imaging device that has captured the imagery is also stored in the storage 201.

Further, the system 200 further comprises an interface 206, by means of which new images are received. The new images may be stored in image data storage part 203 together with information 205 related to an imaging device that has captured the new image, said information comprising intrinsic and extrinsic parameters of the imaging device.

In the illustrated example, imaging device(s) 207 used for capturing at least some of the imagery and/or new images are illustrated as optional part of the system. The imaging devices may be satellite based and/or aircraft based and/or land based. However, it is not important how the imaging data and/or new images are obtained. The important thing that imagery data/new images 203 and imaging device information 205 is stored in the data storage 201.

The system 200 comprises further a processor 208 arranged to receive at least one new image associated to information related to that imaging device which has captured the new image, said information comprising intrinsic and extrinsic parameters of the imaging device, determine that the new image belongs to at least one of the at least one geographical areas, perform registration of the new image to the 3D map representation, determine corresponding points in the new image and the 3D map representation, and determine displacement data for a plurality of 3D positions in the 3D map representation based on the determined corresponding points in the new image and the 3D map representation. The processor may be arranged to operate as discussed in relation to the flow chart of FIG. 1.

The determined displacement data may be stored 204 in the data storage 201.

The processor 208 may further comprises a program code for calculating the 3D map representation. Further, a memory may be arranged to store a computer program comprising a program code for performing the method as disclosed herein.

The system 200 may further comprise an interface 209 to an application system, said interface being operatively connected to the storage having stored thereupon the 3D map representation. The system 200 may be arranged to provide the 3D position data, displacement data, when available, and/or modified 3D position data for at least a part of the 3D map representation at request from the application system via the interface 209.

The system 200 may be implemented on a server device. The server device may comprise a first input for a 3D map representation and a second input for images. The server device also comprises the processor on which a computer program runs, which makes the server device to perform the method as, disclosed herein.

In the example of FIG. 3, capture of images of an area on the ground 1 using a first satellite 10 and a second satellite 11 is schematically shown. As is shown in FIG. 1 the first satellite 10 captures a first two-dimensional (2D) satellite image of a first area 2 from a first angle and the second satellite 11 captures a second two dimensional (2D) satellite image of the first area 2 from a second angle.

Each one of the 2D satellite images is associated with information related to the imaging device that has captured the imagery, said imagery comprising intrinsic and/or extrinsic parameters of the imaging device. The intrinsic and/or extrinsic parameters may comprise a pointing direction of the satellite data and/or distance information indicating a distance from the satellite to the ground and/or a geographical position of the satellite. A 3D map representation comprising geocoded reference data and texture is generated from the 2D satellite images, using the information related to the imaging device(s).

Generally, a set of images is provided wherein the images have been captured by the at least one camera. The set of images comprises a first image captured with the at least one camera is directed in a first direction in the first area 2. The set of images comprises a second image captured with the at least one camera directed in a second direction to the first area 2. The image set comprises a plurality of at least partly overlapping images each covering at least a part of the area 2.

The generation of a 3D map representation from 2D images is known from the prior art. Generation of a 3D map from 2D images comprises generally the steps of providing a plurality of overlapping images of an area and developing the 3D model based on the plurality of overlapping images. This will be more discussed in relation to FIG. 5.

Imagery using aerial or satellite images is often referred to as air- or space-born imagery.

FIG. 4 illustrates how a part of the globe may be covered by capturing image sets for a plurality of, in this case six, different areas 2a-2f of the ground, which areas may or may not be slightly overlapping each other. This makes it possible to fit the captured images to each other. At least 2 satellite test images are captured of each area 2a-2f.

Figure 5:
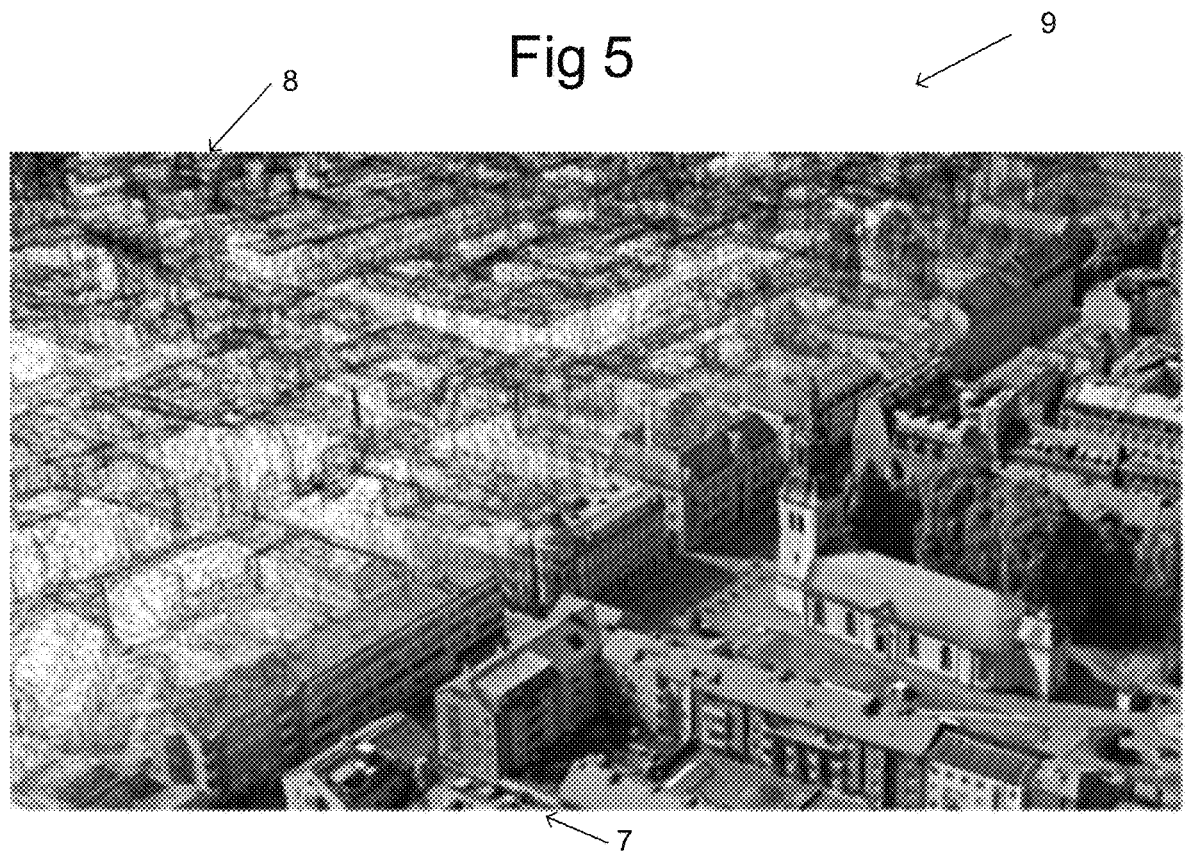
FIG. 5 illustrates an example of a 3D map representation.

FIG. 5 illustrates a 3D map representation 9 comprising geocoded reference data and texture information on the lower right part 7 of the map and comprising only geocoded reference data on the upper left part 8 of the map. After generation of the geocoded reference data the 3D map 9 looks like the upper left part 8 of the 3D map 9. The texture information is then applied by for example using the texture of at least some of the 2D images or to create a 3D map 9 as is shown in the lower right part 7.

As discussed above, processing of the at least partly overlapping images of an image set belonging to an area to provide the 3D map representation comprises finding corresponding points in the at least partly overlapping images and to find disparity estimations based on the corresponding points. In an example, for each image to be processed, a geocoded reference data position is provided to each or a plurality of the pixels of each image. The processing is then performed based on the associated geocoded reference data so that the pixels in the 3D map representation are also specified in three geographical dimensions.

The forming of the 3D map representation based on at least partly overlapping images comprises performing bundle adjustment. Given a set of images depicting a number of 3D points from different viewpoints, bundle adjustment can be defined as the problem of simultaneously refining the 3D coordinates describing the scene geometry as well as the parameters of the relative motion and the optical characteristics of the camera(s) employed to acquire the images, according to an optimality criterion involving the corresponding image projections of all points.

There are a different ways of representing the 3D map. The 3D map may be represented as a mesh, as a surface representation, or as a voxel representation.

The 3D map representation may be provided based on other information than camera images. For example, the 3D map representation may be provided based on any type of distance measurements. For example, example LIDAR, sonar, distance measurement using structured light and/or radar can be used instead of or in addition to measurements based on camera images. The camera for example can be a camera for visual light or an IR camera.

For example, processing may be performed to provide the results of a plurality of distance measurements to each area from a plurality of geographically known positions using a distance determining device. The 3D map representation is then provided for each area based on the plurality of distance measurements.

In the illustrated example, the 3D map is represented as a mesh. A processor is arranged to form the mesh based on the map representation specified in the three geographical dimensions. Further, texture information from the original images may be associated to the surfaces of the mesh. In detail, the processor is arranged to form the mesh by forming nodes interconnected by edges forming surfaces defined by the edges, wherein each node is associated to a three-dimensional geocoded reference data in a geographical coordinate system.

Figure 6:
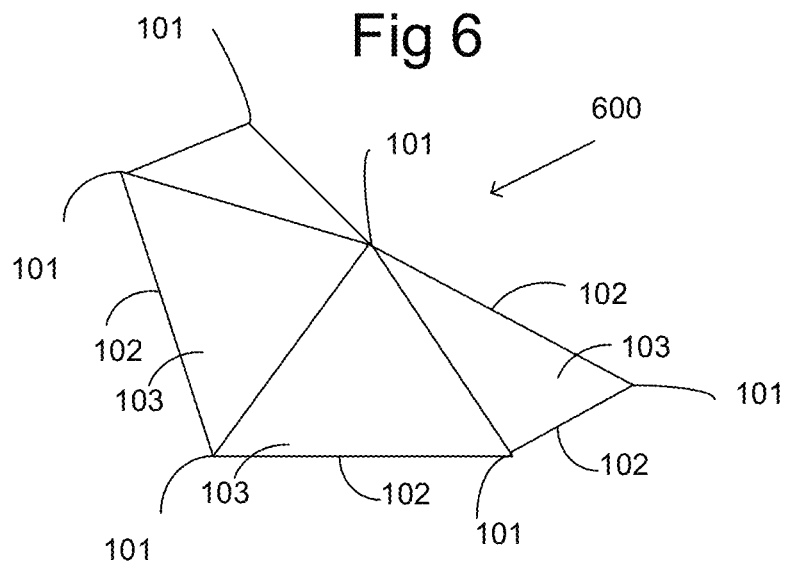
FIG. 6 illustrates schematically a mesh.

In FIG. 6, a 3D map representation is formed as a mesh 600. The mesh 600 comprises a plurality of nodes 101 interconnected by means of edges 102. Surfaces 103 are provided boarded by the edges 102 of the mesh 600. The nodes 101 are each associated to a 3D coordinate in a geographical coordinate system. The surfaces 103 are in one example each associated to texture information. In one example, the surfaces are also each associated to 3D coordinate data in the geographical coordinate system. Further, a mesh uncertainty is associated to at least a subset of the nodes of the mesh. The mesh uncertainty associated to each respective node represents the uncertainty at that specific point of the model. In one example, the mesh uncertainty is associated to each node of the mesh. Determination of a mesh uncertainty is for example discussed in WO2014/112908.

Instead, or in addition thereto, at least a subset of the surfaces and/or edges can be associated to a mesh uncertainty. In one example, one mesh uncertainty is associated to each surface and/or edge. Alternatively, each surface and/or edge is associated to a plurality of mesh uncertainty values. For example, the mesh uncertainty values of the edges/surfaces are determined based on interpolation between neighbouring nodes.

Figure 7:
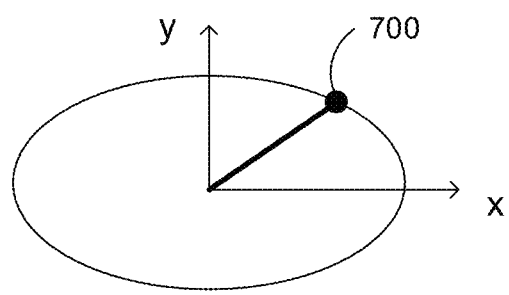
FIG. 7 illustrates schematically a mesh uncertainty.

In FIG. 7, the mesh uncertainty is illustrated. A value 700 for the mesh uncertainty is given in at least two directions. In the illustrated example, the mesh uncertainty value 700 is given in two dimensions. The uncertainty value in each direction is in one example represented as a distance or another value related to the distance. In one example, the uncertainty is represented as a value and possibly also direction in the plane of the surface and as a value in a direction perpendicular to the plane of the surface. In accordance with this example, each uncertainty is represented in relation to the associated local plane given by the surface of the mesh. When the uncertainty is given in space, the uncertainty defines an ellipsoid, the size and shape of which is given by the uncertainty value in each respective direction. In one example when the mesh uncertainty is given in three dimensions, it is represented as a 3×3 matrix. In one example when the mesh uncertainty is given in two dimensions, it is represented as a 2×2 matrix. The uncertainty may be represented as a probability.

Below follows some detailed examples of how uncertainty information can be provided.

The position of the at least one imaging device in the geographical coordinate system may for example be determined using a satellite based positioning system, such as GPS. The positioning of the imaging device can then be determined based on information provided from satellites of the satellite based positioning system. Uncertainty information may for example be based on the number of satellites used for determining the position of imaging device.

The mesh uncertainty may instead or in addition thereto be determined based on an uncertainty in the position and direction of the optical axis of the at least one imaging device. In accordance therewith, a positioning system is arranged to provide uncertainty information in three dimensions (x, y, z, and three associated angles). The direction of the optical axis of the imaging system can then be determined based on the information provided from the positioning system. The positioning system comprises in one example an inertial navigation system.

The mesh uncertainty may instead or in addition thereto be determined based on an imaging uncertainty of the imaging device. For example, the imagining uncertainty of the imaging device can comprise an uncertainty related to the field of view of the imaging device. Further, the imagining uncertainty of the imaging device can comprise an uncertainty related to the optical axis of each of the pixels of the camera. The imaging uncertainty of the camera may then be determined based on the at least one of the above uncertainties. Errors in the field of view and/or the direction of the pixels of the camera can be modelled and compensated for but still there is an imaging uncertainty based on errors in the model of the camera. The errors in the field of view and/or direction of the pixels or the camera are characteristically temperature dependent.

The processor may in addition thereto or instead be arranged to determine the number of images available for use in modelling a certain area and determining the mesh uncertainty based on the number of images available for the certain area. If let us say twenty images is available for a certain area, this indicates that this area or point is visible from many directions and thus easier to model. If on the other hand the point or area is visible in much fewer images, or example two to four, this point or area is more difficult to model correctly.

Further, the processor may be arranged to determine the spatial relation between the images available and to determine the mesh uncertainty based on the spatial relation between the images available. For example, if images are only available from a narrow angle, the uncertainty is bigger than if images are available from a wide angle. Further, if only images taken from a long distance are available, the uncertainty is bigger than if there are images available from a narrow distance. Further, if the images are taken from an angle substantially perpendicular to the surface to be modelled the uncertainty is smaller than if the image is taken almost in parallel with the surface to be modelled. The same reasoning applies when the model is built up from information from distance measurement devices.

In one example, the uncertainty of the mesh can in addition thereto or instead be determined based on comparing an image $I_2$ taken from one certain location with an estimated image $\hat{I}_2$ determined for the same certain location. The estimated image is determined based on another image $I_1$ taken from another location and projected in the 3D model to the position to the location of the image $I_2$. Thus the estimated image is determined as $\hat{I}_2=f(I_1, M)$, wherein M represents the 3D model. In comparing the image $I_2$ taken from the certain location with the estimated image $\hat{I}_2$ for that certain location determined based on another image $I_1$ taken from another location, the similarity between the image and the estimated image can be compared. In one example, the images are compared on a point by point basis. Based on discrepancies between the images, it can then be identified if for example certain objects in the model are erroneously modelled. These errors in the model are in one example contained in the uncertainty related to each point/edge/surface in the mesh.

The texture can be removed and replaced with the colour coding based on the mesh uncertainties. It is then illustrated in which parts of the model the mesh uncertainties are acceptable and in which parts they are not. It is then possible for a user of the 3D map representation to know where in the geography the representation is more reliable and where it is less reliable and also providing a measure of the reliability. In one example, the texture of the mesh can be presented along with the mesh uncertainties. In one example, the texture is presented in black and white. The texture may be presented in a semi-transparent manner.

The above described embodiments may be amended in many ways without departing from the scope of the present invention, which is limited only by the appended claims.

The invention claimed is:

1. A system (200) arranged to provide improved geocoded reference data to a 3D map representation, said system (200) comprising:
 a storage (201) having stored thereupon a 3D map representation, said 3D map representation comprising for each of at least one geographical area, a textured 3D representation provided with geocoded reference data and formed based on imagery provided for that geographical area, said imagery being associated with information relating to at least one imaging device which has captured the imaging, said information comprising intrinsic and extrinsic parameters of said at least one imaging device, and
 a processor (208) configured to:

receive at least one new image associated with information related to an imaging device which has captured the new image, said information comprising intrinsic and extrinsic parameters of the imaging device, determine that the new image belongs to at least one of the at least one geographical areas, perform registration of the new image to the 3D map representation, determine corresponding points in the new image and the 3D map representation, and determine displacement data for a plurality of 3D positions in the 3D map representation based only on the determined corresponding points in the new image and the 3D map representation, wherein:

the determination of displacement data for a plurality of 3D positions in the 3D map representation for a plurality of 3D positions in the 3D map representation comprises weighting the influence from the new image against the influence from the 3D map representation and the weighting of the influence from the new image against the influence from the 3D map representation is based on at least one of:

the specification of the imaging device(s) used, or reliability of relevant intrinsic and/or extrinsic parameters of the respective imaging device(s) used for the 3D map representation and/or the new image.

2. The system according to claim 1, wherein the 3D map representation is modified with the determined displacement data for the plurality of 3D positions.

3. The system according to claim 2, wherein the determination of displacement data for a plurality of 3D positions in the 3D map representation for a plurality of 3D positions in the 3D map representation comprises weighting the influence from the new image against the influence from the 3D map representation.

4. The system according to claim 1, wherein the 3D map representation further comprises 3D representation uncertainty data for a plurality of 3D positions in the 3D representation, said uncertainty data defining an uncertainty distance and direction, wherein the determination of displacement data for a plurality of 3D positions in the 3D map representation comprises weighting the influence from the new image against the influence from the 3D map representation based on the uncertainty data.

5. The system according to claim 1, wherein:

the system further comprises an interface (209) to an application system, said interface being operatively connected to the storage having stored thereupon the 3D map representation, and the system is arranged to provide the 3D position data for at least a part of the 3D map representation at request from the application system via the interface.

6. The system according to claim 1, wherein the processor (208) is further configured to re-calculate the 3D map representation based on the imagery and the at least one new image.

7. The system according to claim 1, wherein the processor (208) is further configured to identify whether to make a re-calculation of the 3D map representation based on the displacement data.

8. The system according to claim 1, wherein the images of the image set and/or new image(s) comprise satellite images captured from one or a plurality of satellites.

9. The system according to claim 1, wherein the 3D representation provided with geocoded reference data and comprises a textured, georeferenced mesh.

10. A non-transitory computer-readable storage medium including instructions which, when executed by at least one processor, cause the at least one processor to carry out a method (100) for providing improved georeferenced position data to a 3D map representation, said 3D map representation comprising for each of at least one geographical area, a textured 3D representation provided with geocoded reference data and formed based on imagery provided for that geographical area, said imagery being associated with information relating to at least one imaging device which has captured the imagery, said information comprising intrinsic and extrinsic parameters of the at least one imaging device, the method comprising the steps of:

receiving (120) at least one new image associated with information related to an imaging device which has captured the new image, said information comprising intrinsic and extrinsic parameters of the imaging device, determining (130) that the new image belongs to at least one of the at least one geographical areas, performing (140) registration of the new image to the 3D map representation, determining (150) corresponding points in the new image and the 3D map representation, determining (160) displacement data for a plurality of 3D positions in the 3D map representation based only on the determined corresponding points in the new image and the 3D map representation, and calculating updated 3D representation uncertainty data based on the displacement data, wherein the updated 3D representation uncertainty data may be stored as part of the 3D map representation.

11. The non-transitory computer-readable storage medium of claim 10, wherein the at least one processor is further configured to re-calculate the 3D map representation based on the imagery and the at least one new image.

12. The non-transitory computer-readable storage medium of claim 10, wherein the at least one processor is further configured to identify whether to make a re-calculation of the 3D map representation based on the displacement data.

13. A system (200) arranged to provide improved geocoded reference data to a 3D map representation, said system (200) comprising:

a storage (201) having stored thereupon a 3D map representation, said 3D map representation comprising for each of at least one geographical area, a textured 3D representation provided with geocoded reference data and formed based on imagery provided for that geographical area, said imagery being associated with information relating to at least one imaging device which has captured the imaging, said information comprising intrinsic and extrinsic parameters of said at least one imaging device, and a processor (208) configured to:

receive at least one new image associated with information related to an imaging device which has captured the new image, said information comprising intrinsic and extrinsic parameters of the imaging device, determine that the new image belongs to at least one of the at least one geographical areas, perform registration of the new image to the 3D map representation, determine corresponding points in the new image and the 3D map representation, and determine displacement data for a plurality of 3D positions in the 3D map representation based only on the determined corresponding points in the new image and the 3D map representation, wherein:

the imagery comprises an image set comprising at least partly overlapping images belonging to the geographical area, each image of the image set being associated with the information relating to the imaging device which has captured the image, said information comprising intrinsic and extrinsic parameters of the imaging device, and determining corresponding points in the new image and the 3D map representation comprises performing bundle adjustments between the new image and each image of the image set at least partly overlapping with the new image.

14. The system (200) according to claim 13, wherein at least one of:

the 3D map representation is modified with the determined displacement data for the plurality of 3D positions;

the processor (208) is further configured to re-calculate the 3D map representation based on the imagery and the at least one new image;

the processor (208) is further configured to identify whether to make a re-calculation of the 3D map representation based on the displacement data;

the images of the image set and/or new image(s) comprise satellite images captured from one or a plurality of satellites; and the 3D representation provided with geocoded reference data and comprises a textured, georeferenced mesh.

15. A system (200) arranged to provide improved geocoded reference data to a 3D map representation, said system (200) comprising:

a storage (201) having stored thereupon a 3D map representation, said 3D map representation comprising for each of at least one geographical area, a textured 3D representation provided with geocoded reference data and formed based on imagery provided for that geographical area, said imagery being associated with information relating to at least one imaging device which has captured the imaging, said information comprising intrinsic and extrinsic parameters of said at least one imaging device, and a processor (208) configured to:

receive at least one new image associated with information related to an imaging device which has captured the new image, said information comprising intrinsic and extrinsic parameters of the imaging device, determine that the new image belongs to at least one of the at least one geographical areas, perform registration of the new image to the 3D map representation, determine corresponding points in the new image and the 3D map representation, and determine displacement data for a plurality of 3D positions in the 3D map representation based only on the determined corresponding points in the new image and the 3D map representation, wherein:

the 3D map representation further comprises 3D representation uncertainty data for a plurality of 3D positions in the 3D representation, said uncertainty data defining an uncertainty distance and direction, wherein the determination of displacement data for a plurality of 3D positions in the 3D map representation comprises weighting the influence from the new image against the influence from the 3D map representation based on the uncertainty data, the processor (208) is configured to calculate updated 3D representation uncertainty data based on the displacement data, and the updated 3D representation uncertainty data may be stored as part of the 3D map representation.

16. The system (200) according to claim 15, wherein at least one of:

the 3D map representation is modified with the determined displacement data for the plurality of 3D positions;

the processor (208) is further configured to re-calculate the 3D map representation based on the imagery and the at least one new image;

the processor (208) is further configured to identify whether to make a re-calculation of the 3D map representation based on the displacement data;

the images of the image set and/or new image(s) comprise satellite images captured from one or a plurality of satellites; and the 3D representation provided with geocoded reference data and comprises a textured, georeferenced mesh.

17. A system (200) arranged to provide improved geocoded reference data to a 3D map representation, said system (200) comprising: a storage (201) having stored thereupon a 3D map representation, said 3D map representation comprising for each of at least one geographical area, a textured 3D representation provided with geocoded reference data and formed based on imagery provided for that geographical area, said imagery being associated with information relating to at least one imaging device which has captured the imaging, said information comprising intrinsic and extrinsic parameters of said at least one imaging device, and a processor (208) configured to: receive at least one new image associated with information related to an imaging device which has captured the new image, said information comprising intrinsic and extrinsic parameters of the imaging device, determine that the new image belongs to at least one of the at least one geographical areas, perform registration of the new image to the 3D map representation, determine corresponding points in the new image and the 3D map representation, and determine displacement data for a plurality of 3D positions in the 3D map representation based only on the determined corresponding points in the new image and the 3D map representation, wherein, when the 3D map representation comprises a textured 3D representation for a plurality of geographical areas, the processor is further configured to: determine whether the new image belongs to at least two geographical areas and when it has been determined that the image belongs to at least two geographical areas and thus forms a bridge between said two geographical areas, and determine displacement data for a plurality of 3D positions in the textured 3D representations belonging to the two geographical areas based on the determined corresponding points in the new image and the textured 3D representations belonging to the two geographical areas.

18. The system (200) according to claim 17, wherein at least one of:

the 3D map representation is modified with the determined displacement data for the plurality of 3D positions;

the processor (208) is further configured to re-calculate the 3D map representation based on the imagery and the at least one new image;

the processor (208) is further configured to identify whether to make a re-calculation of the 3D map representation based on the displacement data;

the images of the image set and/or new image(s) comprise satellite images captured from one or a plurality of satellites; and the 3D representation provided with geocoded reference data and comprises a textured, georeferenced mesh.

19. A non-transitory computer-readable storage medium including instructions which, when executed by at least one processor, cause the at least one processor to carry out a method (100) for providing improved georeferenced position data to a 3D map representation, said 3D map representation comprising for each of at least one geographical area, a textured 3D representation provided with geocoded reference data and formed based on imagery provided for that geographical area, said imagery being associated with information relating to at least one imaging device which has captured the imagery, said information comprising intrinsic and extrinsic parameters of the at least one imaging device, the method comprising the steps of:

receiving (120) at least one new image associated with information related to an imaging device which has captured the new image, said information comprising intrinsic and extrinsic parameters of the imaging device, determining (130) that the new image belongs to at least one of the at least one geographical areas, performing (140) registration of the new image to the 3D map representation, determining (150) corresponding points in the new image and the 3D map representation, determining (160) displacement data for a plurality of 3D positions in the 3D map representation based only on the determined corresponding points in the new image and the 3D map representation, and determining whether the new image belongs to at least two geographical areas and when it has been determined that the new image belongs to at least two geographical areas and thus forms a bridge between said two geographical areas, and determining displacement data for a plurality of 3D positions in the textured 3D representations belonging to the two geographical areas based on the determined corresponding points in the new image and the textured 3D representations belonging to the two geographical areas.

20. The non-transitory computer-readable storage medium of claim 19, wherein either:

the at least one processor is further configured to re-calculate the 3D map representation based on the imagery and the at least one new image; or the at least one processor is further configured to further configured to identify whether to make a re-calculation of the 3D map representation based on the displacement data.

* * * * *